(12) United States Patent
Chen et al.

(10) Patent No.: US 6,920,598 B2
(45) Date of Patent: Jul. 19, 2005

(54) SYSTEM AND METHOD FOR ERROR RECOVERY USING NAKS

(75) Inventors: Tsao-Tsen Chen, Boonton, NJ (US); Wen-Yi Kuo, Morganville, NJ (US); Gang Li, Bridgewater, NJ (US); Mjing Lu, Hillsborough, NJ (US); Martin Meyers, Montclair, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 567 days.

(21) Appl. No.: 09/861,740

(22) Filed: May 21, 2001

(65) Prior Publication Data

US 2002/0174395 A1 Nov. 21, 2002

(51) Int. Cl.[7] ............................................. G08C 25/02
(52) U.S. Cl. ........................................ 714/748; 714/750
(58) Field of Search .......................... 370/13, 336, 474, 370/236, 230; 340/286.02; 714/51, 748, 750

(56) References Cited

U.S. PATENT DOCUMENTS

| | | | | |
|---|---|---|---|---|
| 4,422,171 A | | 12/1983 | Wortley et al. | |
| 5,222,061 A | * | 6/1993 | Doshi et al. | 370/13 |
| 5,425,025 A | | 6/1995 | Tahara | |
| 5,703,562 A | * | 12/1997 | Nilsen | 340/286.02 |
| 6,021,124 A | * | 2/2000 | Haartsen | 370/336 |
| 6,081,568 A | | 6/2000 | Oda | |
| 6,301,681 B1 | * | 10/2001 | Chen et al. | 714/51 |
| 6,381,215 B1 | * | 4/2002 | Hamilton et al. | 370/236 |
| 6,392,993 B1 | * | 5/2002 | Hamilton et al. | 370/230 |
| 6,581,175 B1 | * | 6/2003 | Crump et al. | 714/748 |
| 6,625,172 B2 | * | 9/2003 | Odenwalder et al. | 370/474 |

FOREIGN PATENT DOCUMENTS

| | | |
|---|---|---|
| WO | WO 00/52873 | 9/2000 |
| WO | WO 01/13542 | 2/2001 |

* cited by examiner

Primary Examiner—David Ton

(57) ABSTRACT

In a system of communication, a sending node sends a message to a receiving node, which NAKs unsuccessful transmissions. The sending node screens the NAKs to determine if they were sent before the receiver could receive previous transmissions of the same data NAKed. One screening technique is based on an estimated round trip time of a message. Another alternate technique looks a flag in the NAK that synchronizes the sender and the receiver.

18 Claims, 12 Drawing Sheets

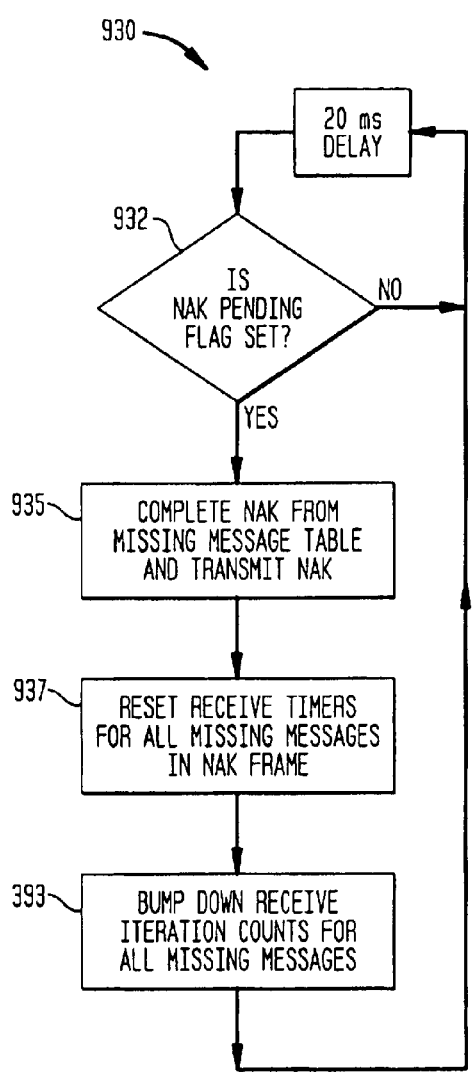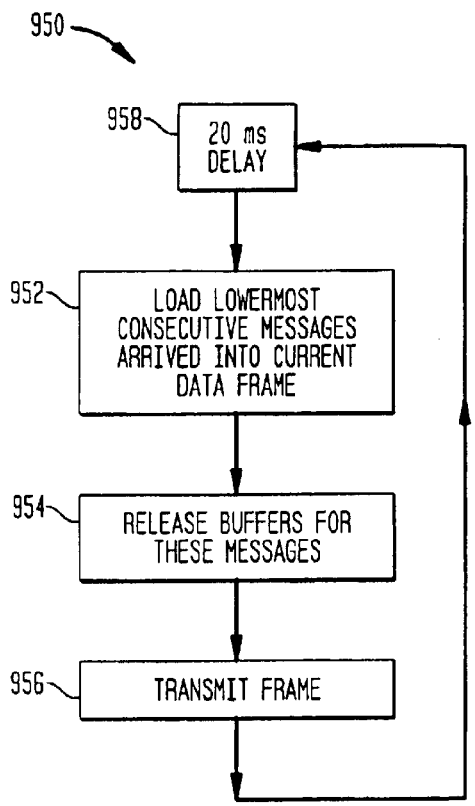

ns on a network. This invention further relates to error
SYSTEM AND METHOD FOR ERROR RECOVERY USING NAKS

FIELD OF THE INVENTION

This invention relates to error recovery in communications on a network. This invention further relates to error recovery based on a NAK (negative acknowledgment).

BACKGROUND

High-speed data sources play an important role in third generation mobile/personal communications. To meet the required Quality of Service (QoS), various Medium Access Control (MAC) protocols are used in wireless networks. Among them, the Radio Link Protocol (RLP) provides an octet stream transport service over physical channels with a best effort recovery capability. A burst control method enables efficient use of radio resources by accommodating the bursty nature of traffic. With optimized RLP and burst assignment algorithms, data services can be improved in throughput and latency.

In standard Automatic Repeat Request (ARQ)-based RLP, the sender is requested for missing data to be retransmitted when errors are detected at the receiving side. A receiver is usually allowed to request for missing data R times where R is a specified integor. The number R may impose a restraint on the capability of error recovery. In the current RLP standard for CDMA, the transmission scheme is the same as the NAK scheme. This means that the number of retransmissions by the data sender is equal to the number of NAK requests it receives. In practice, NAK frames may be lost in transit. To ensure that the RLP sender is notified, the NAK is usually transmitted multiple times, with a set of consecutive NAKs being issued as a "round." For any particular message, as identified by its sequence number, a plurality of rounds may be necessary. Each round is triggered by a failure of the message to arrive at the receiver successfully before expiry of a timer. There exists a need to relieve the amount of traffic without degrading the best-effort recovery capability.

SUMMARY

The present invention is directed to a system and method pertaining to a network having a sending node that sends a first message and a receiving node for receiving the first message. The receiving node sends a NAK to the sending node if the receiving node fails to receive the first message. The sending node is operable to screen the NAK upon receipt to determine whether or not the receipt of the NAK by the sending node triggers retransmission of the first message from the sending node.

DETAILED DESCRIPTION

Figure 1:
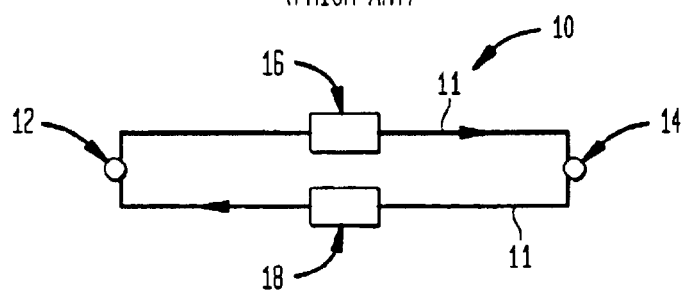
FIG. 1 shows a simplified prior art communication network.

FIG. 1 shows an exemplary communications network 10 having at least two nodes 12 and 14. The network 10 may be a radio wave communications network, in which the node 12 is a mobile station and node 14 is a base station. Alternatively, for example, either node may be a repeater. The sending node or sender 12 transmits a message 16 on a channel 11 to the receiving node or receiver 14. Due to errors on the channel 11, the message 16 may fail to arrive at thereceiver 14, either because the transmission never reaches thereceiver 14, or because the message becomes corrupted in transit. As a precaution, the sender 12 will generally transmit the message 16 multiple consecutive times. This takes advantage of time diversity, so that some iterations of the transmission may survive, for example, a burst error. Successful receipt of the message is, nevertheless, not guaranteed. The receiver 14, as a further measure, issues a NAK to inform the sender 12 that the message has not been received when the receiver 14 detects loss of the message. Messages other than the message 16 are also routed on the channel 11, each message having a unique sequence number. The receiver 14 queues arriving messages so that they are delivered in order to the upper layers. For messages it has dispatched, the sender 12 keeps them queued pending confirmation of their safe arrival at the receiver 14.

Figure 2:
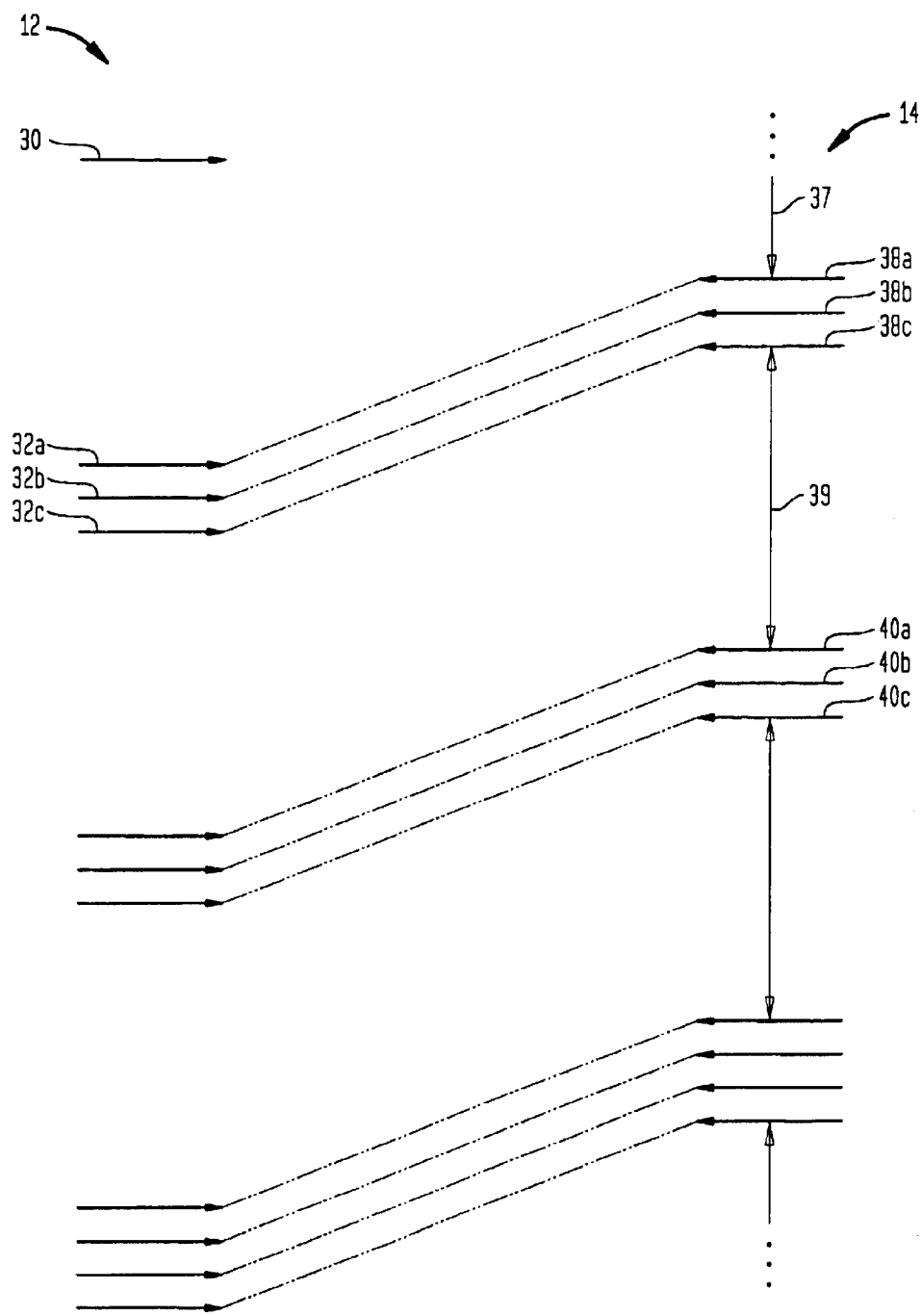
FIG. 2 illustrates a message trace in a prior art communication network.

FIG. 2 shows a trace of a typical routing sequence for any particular message on the network 10. The time sequence of events is represented as progressing from the top of the page to the bottom. A message transmission 30 of the message 16 is followed by a round of NAKs 38a–38c. In response, the sender 12 issues three retransmissions 32a–32c of the message, one retransmission for each NAK the sender 12 has received. It is noted that although the order of arrival of NAKs is shown in FIG. 2 to be the same as the order of their issuance, this will not generally be the case. Upon issuance of the last NAK of the set, NAK 38c, the receiver 14 starts a timer for a predetermined receive time period 39. If the receiver 14 has not successfully received the message by expiry of the timer, the receiver 14 starts a new round of NAKs, consisting of the set of NAKs 40a–40c. A plurality of rounds may be invoked, resulting in much traffic on the channel 11. It is noted, in particular, that the NAKs 38b and 38c can safely be screened or ignored, since they report the same missing data as does the NAK 38a. It is also noted that even if the receiver 14 has successfully received the message by expiry of the timer, a NAK may still be issued—reporting missing data for another message other than the message 16, as explained further below. FIG. 2, again, shows the routing for a single given message.

Figure 3:
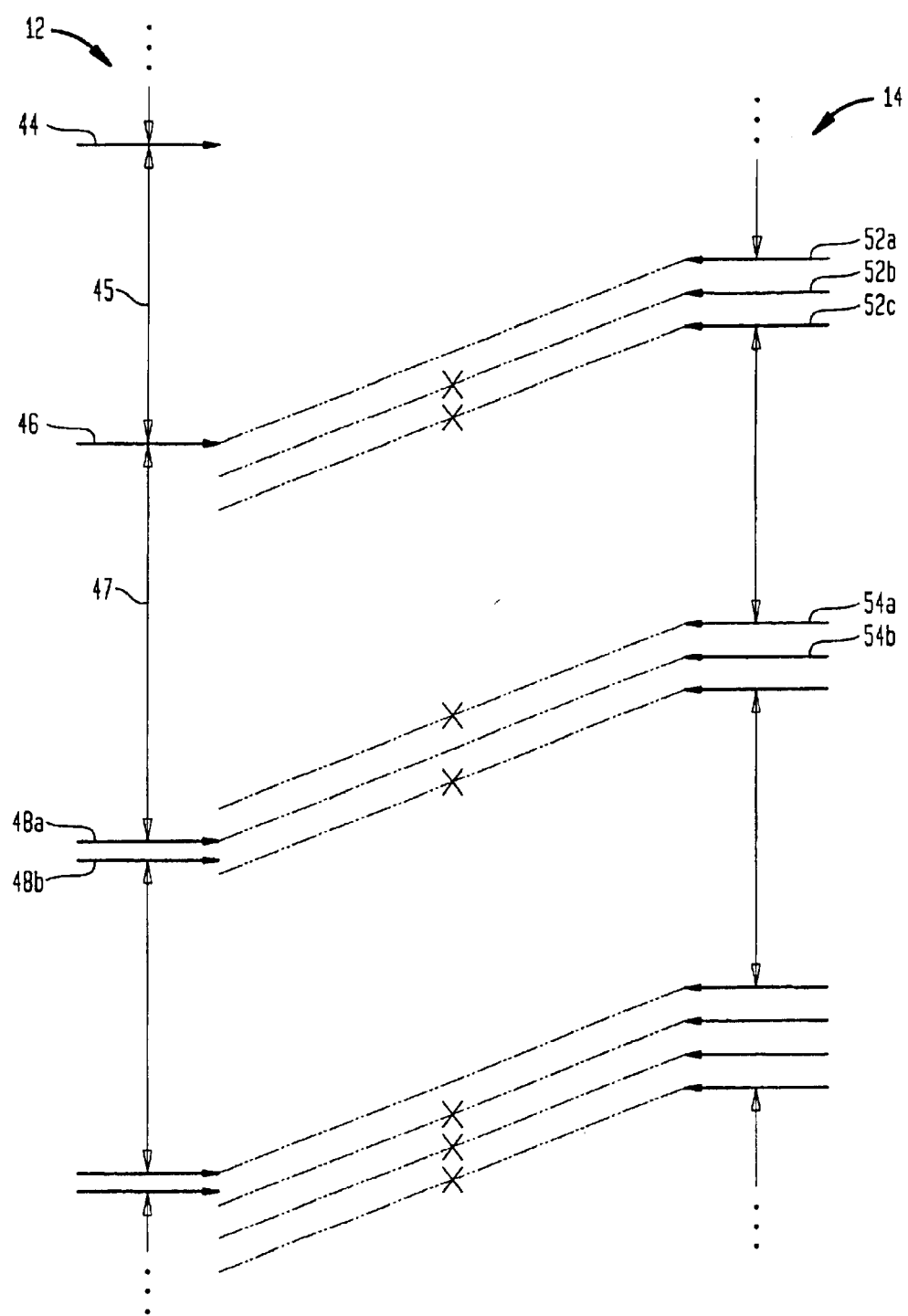
FIG. 3 shows a message trace representative of aspects of the present invention.

FIG. 3 also shows an example of the routing for a given message 16 on the network 10, and represents a first embodiment of the invention. A message transmission 44 is followed by round n of NAKs 52a–52c, where n is an integer. Upon dispatch of the transmission 44, the sender 12 starts a predetermined sender time period 45. The period 45 corresponds to an estimated round trip time between the sender 12 and the receiver 14. Any NAK arriving before the end of the period 45 is assumed to have originated as a result of transmissions from a round previous to the round n, and will be ignored by the sender 12. The reason is that the arriving NAK could not have been issued in response to the transmission 44, whereas the transmission 44 may have successfully delivered a message to the receiver 14. In the invention, not every NAK triggers a corresponding retransmission. Thus, the present invention eliminates unnecessary retransmissions, and the associated traffic. In the illustrative example, the first of the round n NAKs, the NAK 52a, arrives after the period 45, and is therefore not ignored. The arrival of the NAK 52a at the sender 12, results in a round n of retransmissions, here shown as a single retransmission 46, and in the starting of the time period 47. The time period 47, here, for simplicity of demonstration, has a duration equal to that of the period 45, although the present invention is not limited to such equality. The NAKs 52b and 52c, because they arrive before expiry of the period 47, are ignored by the sender 12, and their arrival does not trigger retransmission of messages. The NAK 54a from round n+1 also arrives during the period 47, and is consequently ignored. By contrast, the NAK 54b of the same round, n+1, is not ignored, but, instead, triggers a round n+1 of retransmissions. The round n+1 of retransmissions iterates a plurality of retransmissions, in this case two retransmission, 48a and 48b. The number of retransmissions is a function K(n) of the round number n of retransmissions, and the number of NAKs is a function M(p) at the round number p of NAKs. Providing two separate functions affords flexibility in regulating traffic flow. Parameters K and M are negotiable by the sender 12 and the receiver 14 in establishing the channel 11.

Figure 4:
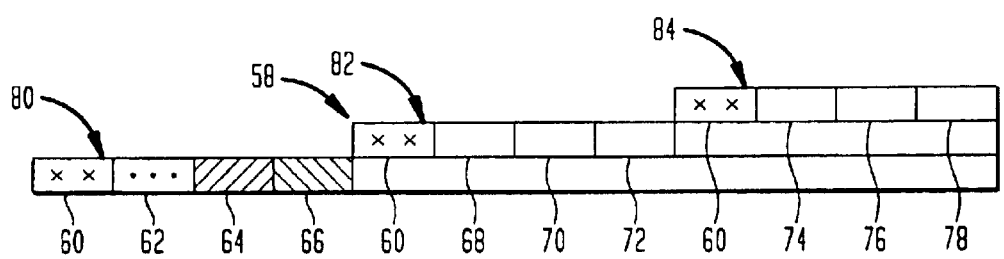
FIG. 4 represents message flow of the present invention.

FIG. 4 shows, in an example for purposes of illustration, that each retransmission of a round of retransmissions will generally dispatch a block consisting of more than one message. As seen in FIG. 4, an exemplary round of retransmission 58 generally consists of multiple retransmissions, in this case three retransmissions 80, 82 and 84. First, a frame containing a data block 80 having four messages 60, 62, 64 and 66, with the message 60 to be retransmitted, is sent out. A frame length later, such as twenty milliseconds later, in another frame, a data block 82 is that data block also transmitted containing message 60, but containing in addition the three different messages 68, 70 and 72. Again, a frame length later, in a further frame, a data block 84 is transmitted, the data block 84 also containing the message 60, but in addition containing three different messages 74, 76 and 78. The message 60 is sent out in three separate iterated retransmissions, so that the loss of any one of the retransmissions does not prevent the message 60 from arriving at receiver 14. The round of retransmissions 58 is set at 3 for the message 60, because each block retransmitted in the round 58 contains the message 60. The other messages transmitted in this round are either retransmitted, or newly transmitted (i.e., newly received at the receiver).

Besides eliminating unneeded retransmissions, ignoring or screening NAKs facilitates flow control. A burst is a supplemental channel that shares traffic load in a given channel, and exists for a burst time interval. At setup of the channel 11, the burst time interval is set. Errors on a channel may increase traffic on the channel 11 so as to invoke a burst. On the other hand, if a channel is plagued by too many errors, the burst assignment is prematurely terminated. Thus, valuable burst resources are released and available elsewhere.

A NAK count adjusted for NAKs that are screened is used to determine an estimated frame error rate (FER). The NAK scheme, wherein the iterations vary by round, may cause fluctuations in the estimated FER that lead to false alarms invoking a burst or that lead to premature termination of a burst. Screening NAKs smoothes fluctuations and reduces the likelihood of these flow control problems. Simulations have shown that the resulting conservative FER estimation can save many data bursts from premature termination. Simulation results have also shown that sufficient input data rate to a channel causes transmission reiterations to degrade throughput. Therefore, if the estimated input data rate exceeds a threshold, retransmission iteration is turned off. Thus, for example, a single retransmission is made for a given message NAKED in a particular round. In effect, a tradeoff is made of possibly losing frames in exchange for not losing the channel. Alternatively, the response to the exceeded threshold is a different retransmission scheme as per negotiations upon setup of the channel. The threshold is defined as $\alpha H$, where H is the bandwidth of the channel (i.e., the maximum data rate the channel can support) and $\alpha$ is a prescribed factor, $0<\alpha<1$. $\alpha$ is determined based on the communication protocol and the multiplexing overhead. The estimated input data rate, which is compared to the threshold, is calculated by the sender using the following equation:

$$\text{Rate }(t)=(\text{counter }(t)-\text{counter }(t-\Delta W)/\Delta W$$

where counter is the number of octets received up to time t; and $\Delta W$ is a sliding window of a size generally several times round trip time (RTT), where RTT=min{RTT for current frame, RTT for previous frame} wherein retransmitted date or frames are excluded in performing the update of the data rate.

Figure 5:
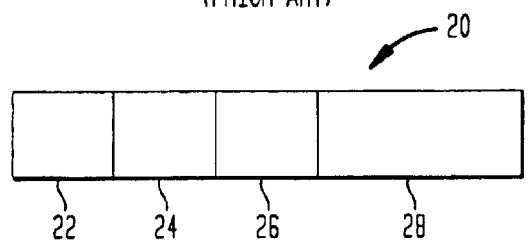
FIG. 5 outlines a message format in the prior art.

FIG. 5 shows a simplified format of a conventional NAK 20 used in RLP. A field 22 is an acknowledgment (ACK), denoting the highest sequence number for the messages successfully received. Based thereupon, the sender will release buffers no longer needed for ensuring successful receipt of the ACKED message. The fields 24 and 26 contain the sequence numbers of the first and last, respectively, of a strictly consecutive string of sequence numbers of messages outstanding. Every message sequence number in between the first and last sequence numbers of the string belongs to message not received at the receiver 14.

Figure 6A:
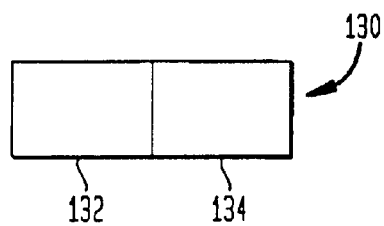
FIGS. 6(a), (b) and (c) show message formats in the present invention.
Figure 6B:
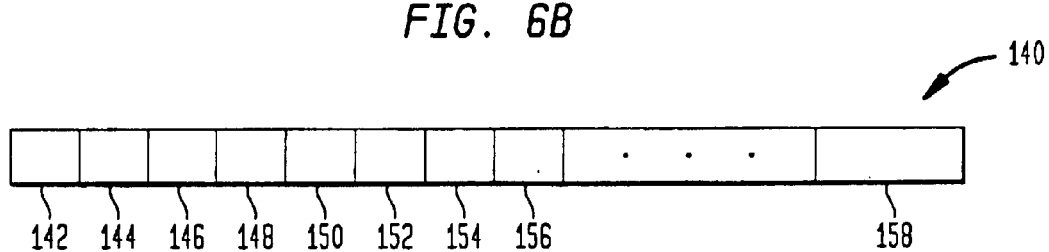

Previous figures show typical flows of a single message, although a plurality of different messages are normally transmitted together. In addition, a sending node 12 will, in general, alternate nodes by acting as a receiver node, and the receiving node 14 will alternate nodes by acting as a sending node, during operation of the network 10. Taking into account these architectural considerations, FIG. 6 shows details of an exemplary NAK in the second embodiment of the invention. FIG. 6(a) shows a NAK frame 130, having a control block 132 and a data block 134. In FIG. 6(b) a control block 140 has as a leftmost field 142 containing the highest message sequence number received at the receiver 14. The field 144 has the number of strings in the NAK 130. The fields 146 and 148 contain the first sequence number of a particular string and the last sequence number of that string, respectively. The next field, 150, has the round number of NAKs for that string. A message is not noticed as missing at the receiver 14 until an arriving message reveals a gap in the sequence numbers, corresponding to a string. At that time, a receive timer is started for each message in the string. As will be discussed below, updating of the round number of NAKs is governed by the receive timer.

Figure 6C:
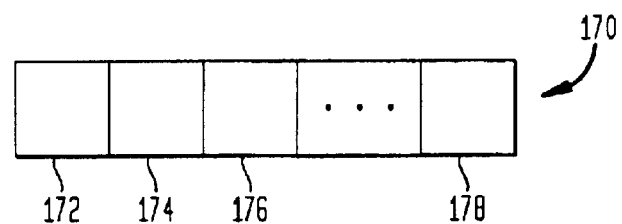

Accordingly, the round number for each message of a string will be the same, and will be referred to as the round number for the string. Fields 152, 154 and 156 are, respectively, the second string's first and last sequence numbers and the round. This sequencing of fields continues for the number of strings in the field 144. A field 158 is padding at the end of the control block 140. In FIG. 6(c), a data block 170 has as a leading field 172 the number of messages. Fields 174 and 176 are, respectively, the first and second of those messages. A field 178 is padding.

Figure 7:
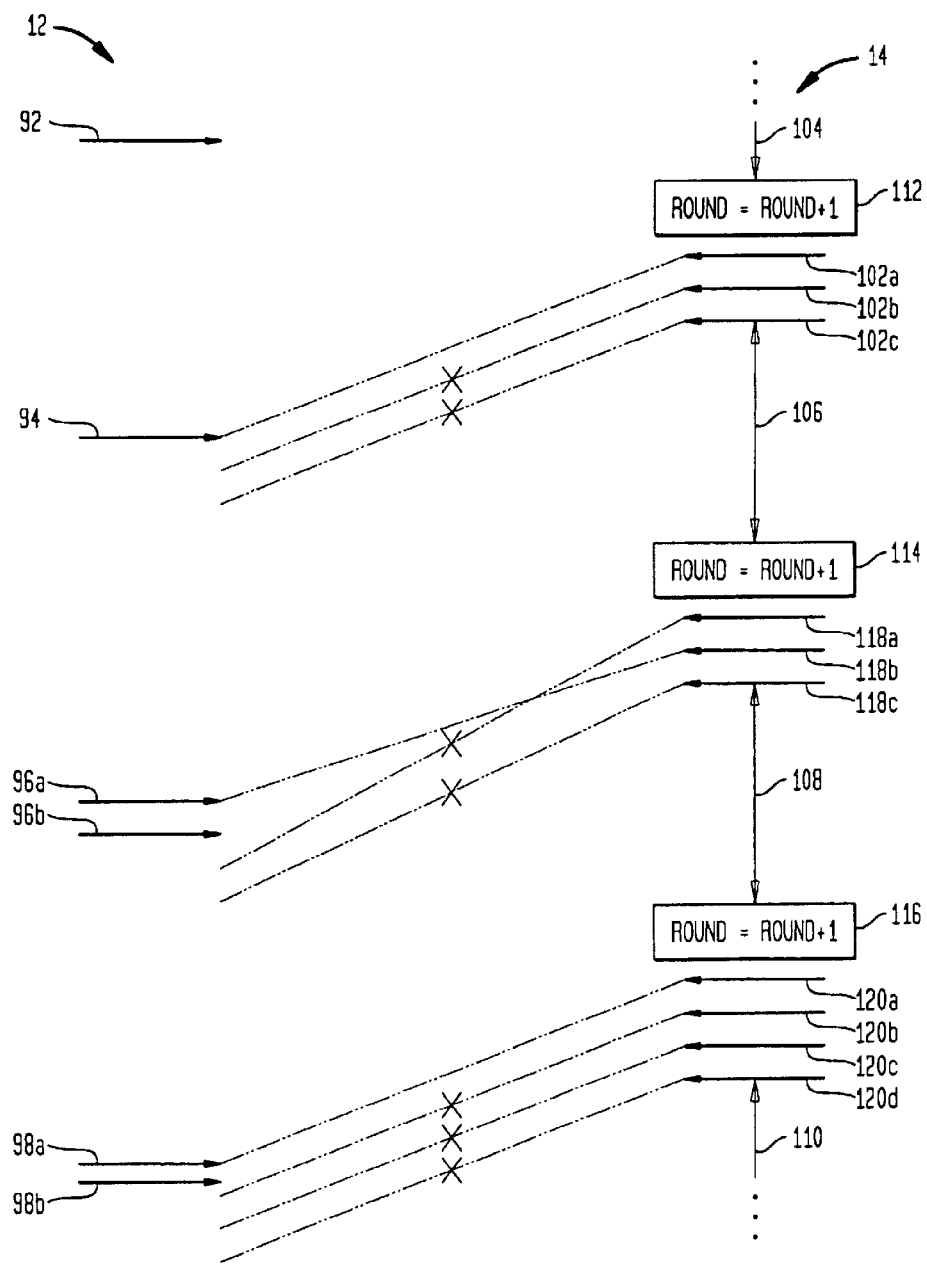
FIG. 7 shows a message trace representative of the aspects the of the present invention.

This format eliminates the need for implementing the sender 12 with send time periods, and the associated timers. FIG. 7 shows an example of the flow of a typical message using this format. Send time periods are not needed, because the sender 12 can check the round number contained in the arriving NAK. A NAK 102a arrives at the sender 12 and triggers a retransmission 94. The NAKs 102b and 102c are ignored by the sender 12, because they indicate round n of retransmission, which already occurred by means of the retransmission 94. When round n NAKs 102a–c are sent out, the receiver 14 starts a receive time period 106. Upon the expiry of the time period 106, the receiver 14 checks whether the expected message has arrived. If not, step 114 increases by one the round of NAKs and dispatches NAKs 118 a, b and c of the resulting round of NAKs, which is now n+1. The sender 12, in the instant example, receives the NAK 118b first. The sender 12 compares the round number in the NAK 118b to the most recent round number of retransmission. Because the arriving round number of NAKs is greater, the sender 12 triggers the next round of retransmission, round n+1, consisting here of two iterations. The later arriving NAKs 118a and 118c report the same missing information as the NAK 118b has already reported, and therefore the NAKs 118a and 118c are ignored by receiver 12. The data field 150 carries the round number, making NAK screening unnecessary. Needless retransmissions are avoided, and iterations of retransmissions can be flexibly set independently of NAK iterations to tune traffic flow.

FIG. 8 shows four exemplary subprocesses, 810, 840, 850 and 860, for operating the sender 12 of the first embodiment. A block fill subprocess 810 in FIG. 8(a) queries at step 812 whether a frame is ready for transmission. If so, the frame is marked for transmission (step 814). For all messages marked for retransmission, the transmit iteration counts are bumped down. If no frame is ready for transmission, step 816 queries if any message is marked for retransmission. If not, step 818 queries if any message is queried on the input of the sender 12. If not, after a delay 820, there is again a query on whether a frame is ready for transmission. If messages are queried on input, they are loaded into a frame (step 822) to the extent they will fit. If a message is marked for retransmission, query is made whether the leading message, the message for which retransmission takes on the highest priority, has a nonzero transmit iteration count (step 824). If so, the leading message is loaded into the frame (step 826). In step 822, any lower priority messages marked for retransmission and any queried input messages are loaded into the remaining part of the frame to the extent they will fit. If the leading message has a zero-valued transmit iteration count, the lowest sequence numbered message marked for retransmission is selected as the leading message (step 828) and its transmit iteration count is set equal to K(n).

Figure 8A:
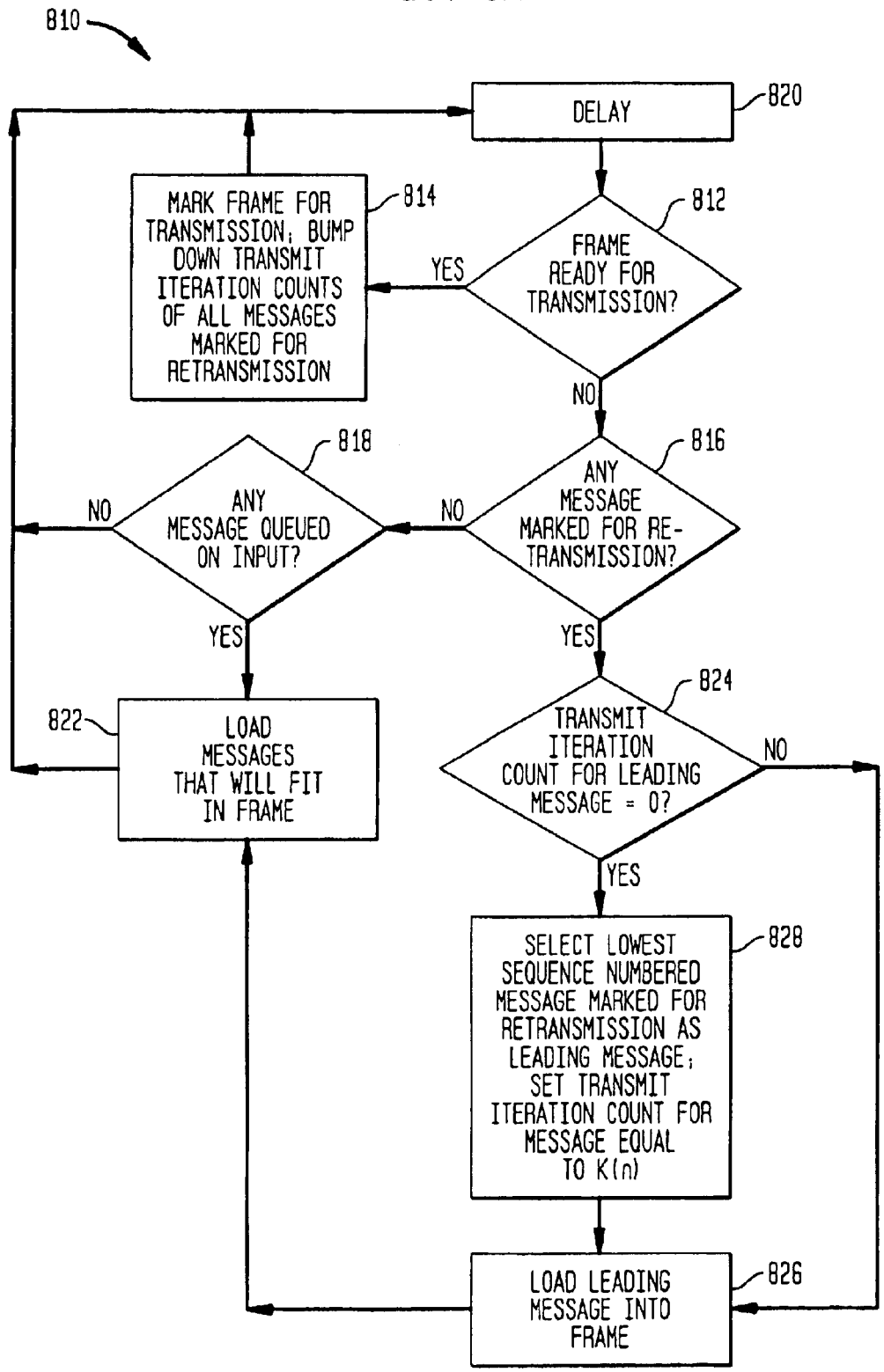
FIGS. 8(a), (b), (c) and (d) provide flow charts of processes at a sender of a first embodiment of the present invention.
Figure 8B:
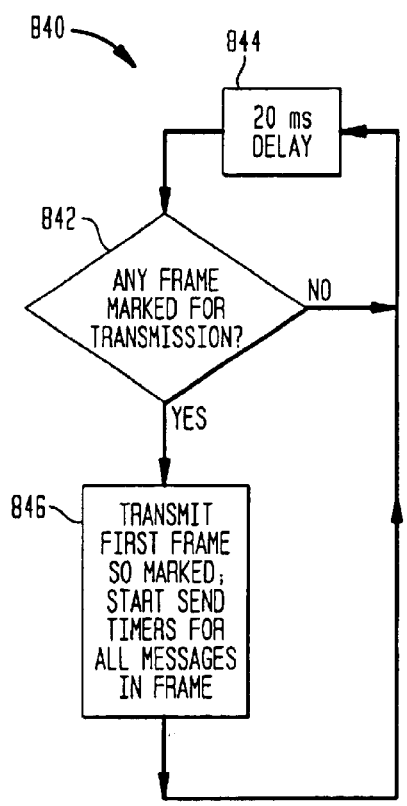

FIG. 8(b) shows a transmitblock subprocess 840. Step 842 determines if any frame is marked for transmission. If not, there is a delay 844. If so, the first frame so marked is transmitted (step 846). Send timers are started for all messages in the frame.

Figure 8C:
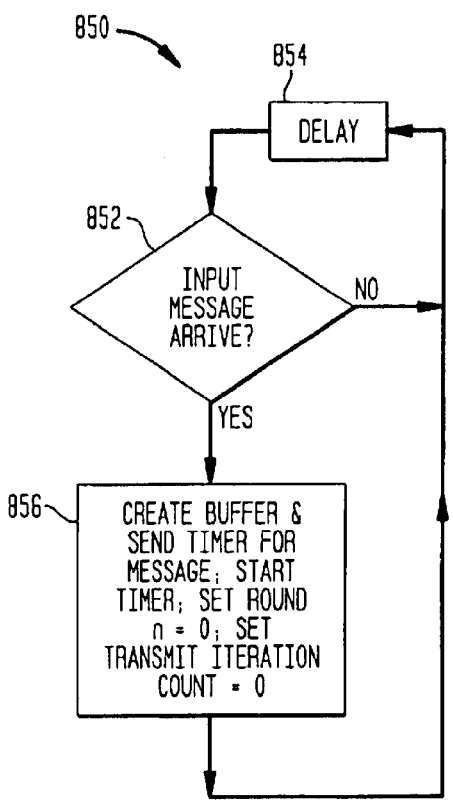

FIG. 8(c) shows an inputmessage subprocess 850. Step 852 queries if an input message has arrived. If not, there is a delay 854. If so, a buffer and a send timer are created for the message (step 856), and the timer is started. The round of retransmission n and the transmit iteration count are both initialized to zero.

Figure 8D:
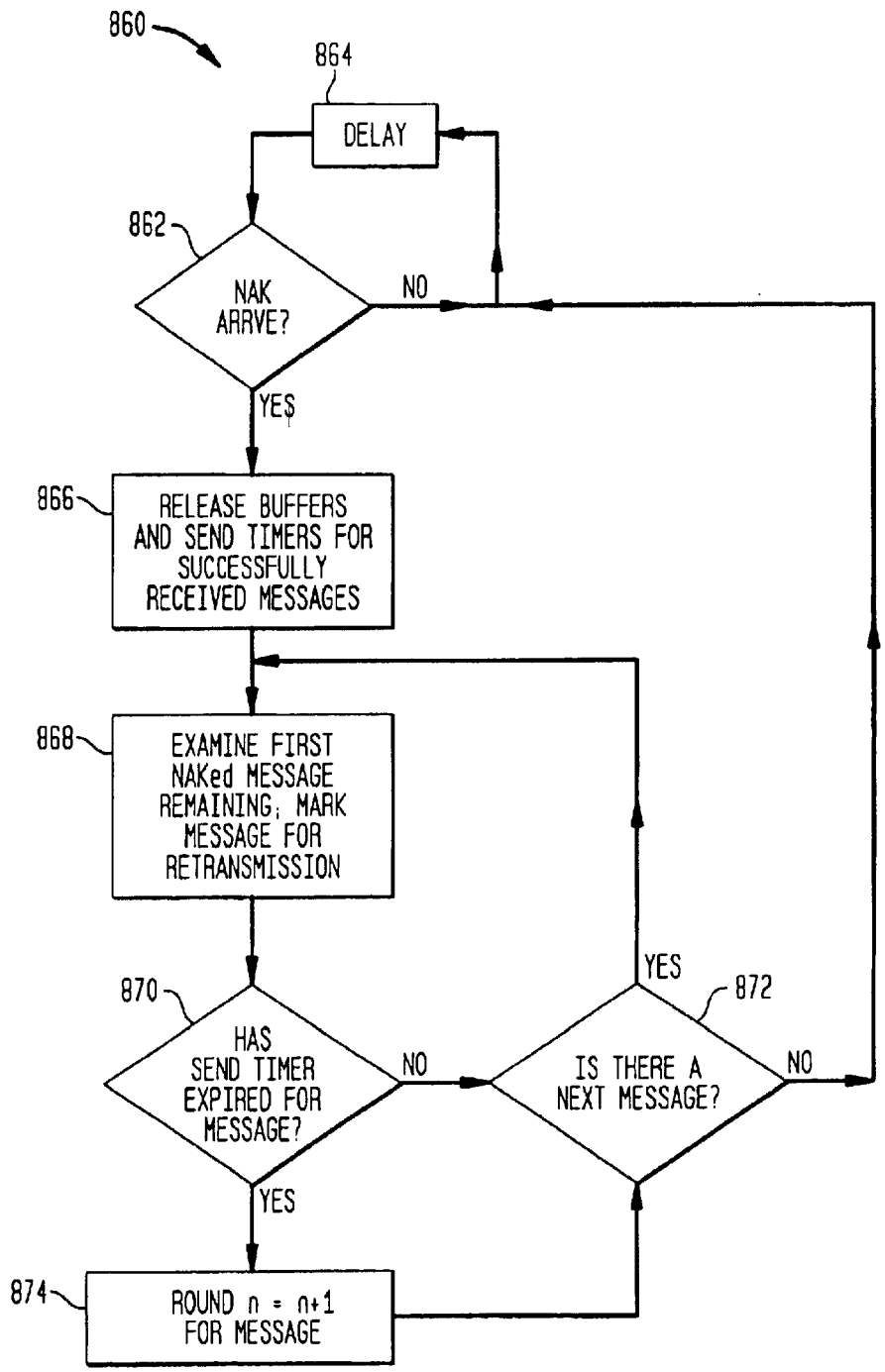

A NAKreceive subprocess 860 in FIG. 8(d) queries of a NAK has arrived (step 862). If not, there is a delay 864. If so, buffers and send timers are released for successfully received messages (step 866). The NAKed messages are examined, one at a time, and marked for retransmission (step 868). For those for which the send timer has expired (steps 870 and 872), the round of retransmission is bumped up (step 874). Optionally step 866 may be moved to the yes leg of step 870, because it is only when the send timer has expired that new information is available from the NAK.

Figure 9A:
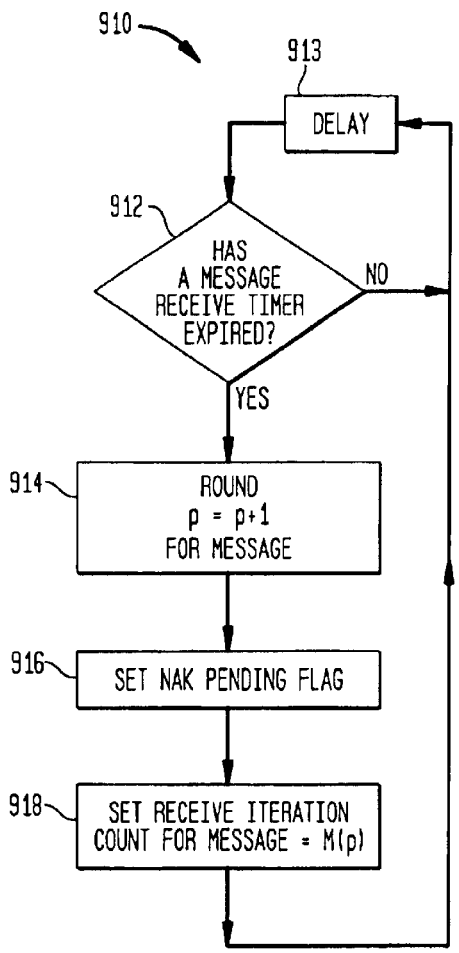
FIGS. 9(a), (b), (c), (d) and (e) provide flow charts of processes at the receiver of a first embodiment of the present invention.

FIG. 9 shows five exemplary subprocesses, 910, 920, 930, 950 and 970, for operating the receiver 14 of the first embodiment. In FIG. 9A, a receivetimer subprocess 910 makes inquiry (step 912) as to whether a message receive timer has expired. If not, there is a delay 913. If so, the round p of NAKs for the message is bumped up (step 914), a NAK pending flag is set (step 916), and a receive iteration count for the message is set to M(p) (step 918).

Figure 9B:
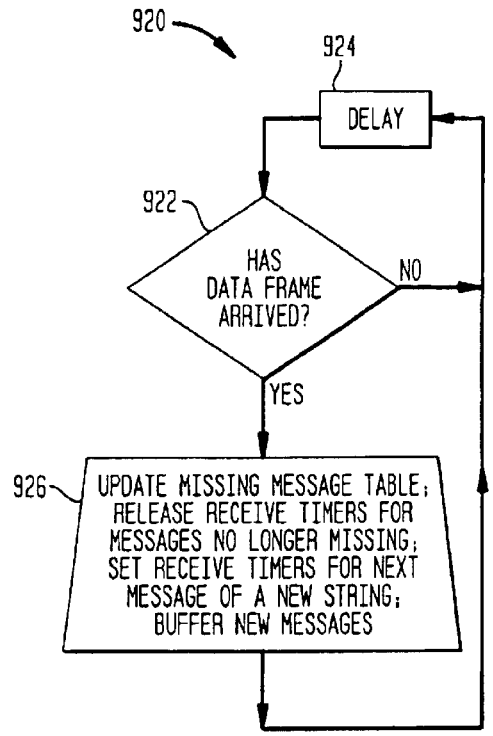

In FIG. 9(b), a framearrived subprocess 920 queries if a data frame has arrived (step 922). If not, there is a delay 924. If so, a missing message table is updated to reflect messages no longer missing at the receive 14. Receive timers are released for those messages no longer missing. Also, if a message arriving out of sequence creates a new string, receive timers are started for each message of the string. Each new message is buffered (step 926).

In FIG. 9(c), a transmitNAK subprocess 930 queries as to whether a NAK pending flag is set (step 932). If not, there is a 20 ms delay 934. If so, a NAK is constructed based on data in the missing message table, and the NAK is transmitted (step 935). Receive timers for all missing messages indicated in the NAK are reset (step 937), and the receive iteration counts for those messages are bumped down (step 939). Steps 935 and 846 may be synchronized to load a NAK and messages into a single frame to fulfill a node's dual role as a sender and as a receiver.

In FIG. 9(d), for an outputreceivedmessages subprocess 950, the lowermost sequence-numbered messages that have arrived at the receiver 14 are loaded into the current frame (step 952). Buffers for those messages are released (step 954). The current frame is outputted (step 956). After a 20 ms delay 958, the subprocess 950 is repeated.

Figure 9E:
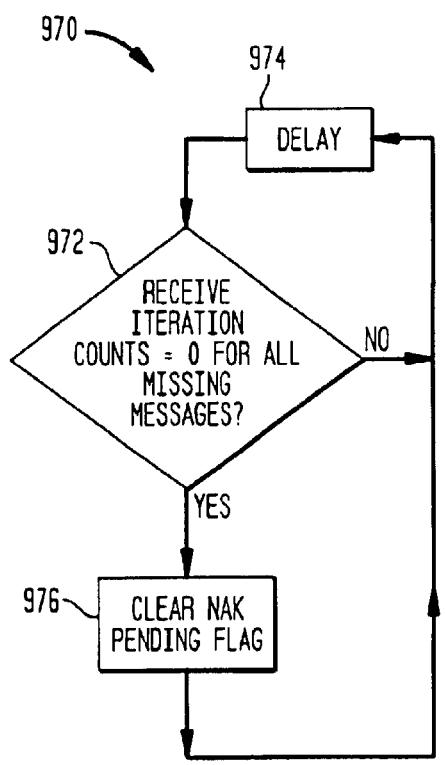

In FIG. 9(e), a NAKpending subprocess 970 queries whether any missing message has a nonzero receive iteration count (step 972). If not, there is a delay 974. If so, the NAK pending flag is cleared.

FIG. 10 illustrates exemplary subprocesses 1010, 1020 and 1030 for operating the sender 12 of the second embodiment. These subprocesses replace subprocesses 840, 850 and 860, respectively, of the first embodiment, while subprocess 810 is retained.

Figure 10A:
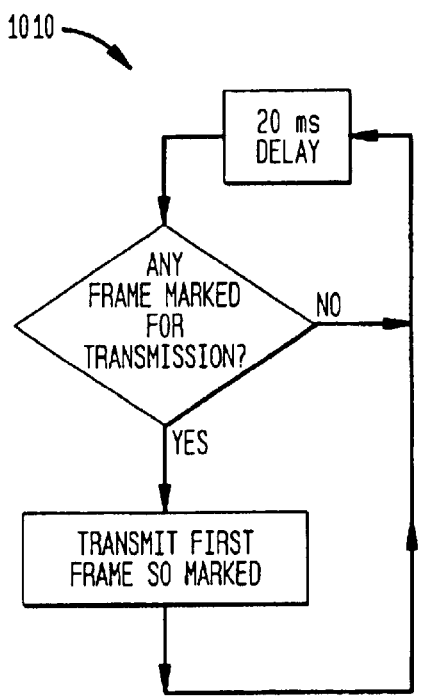
FIGS. 10(a), (b) and (c) provide flow charts of processes at the receiver of a second embodiment of the present invention.
Figure 10B:
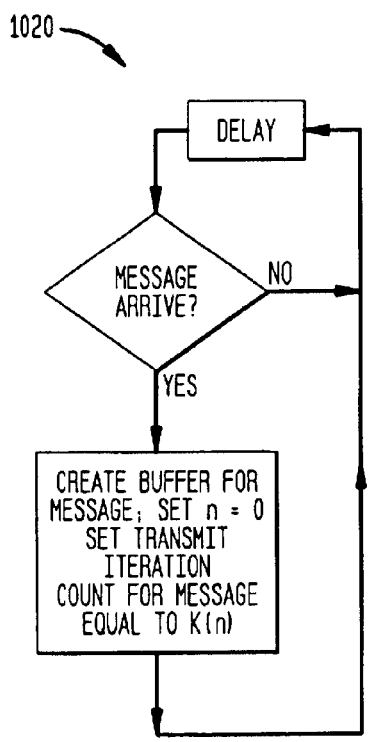
Figure 10C:
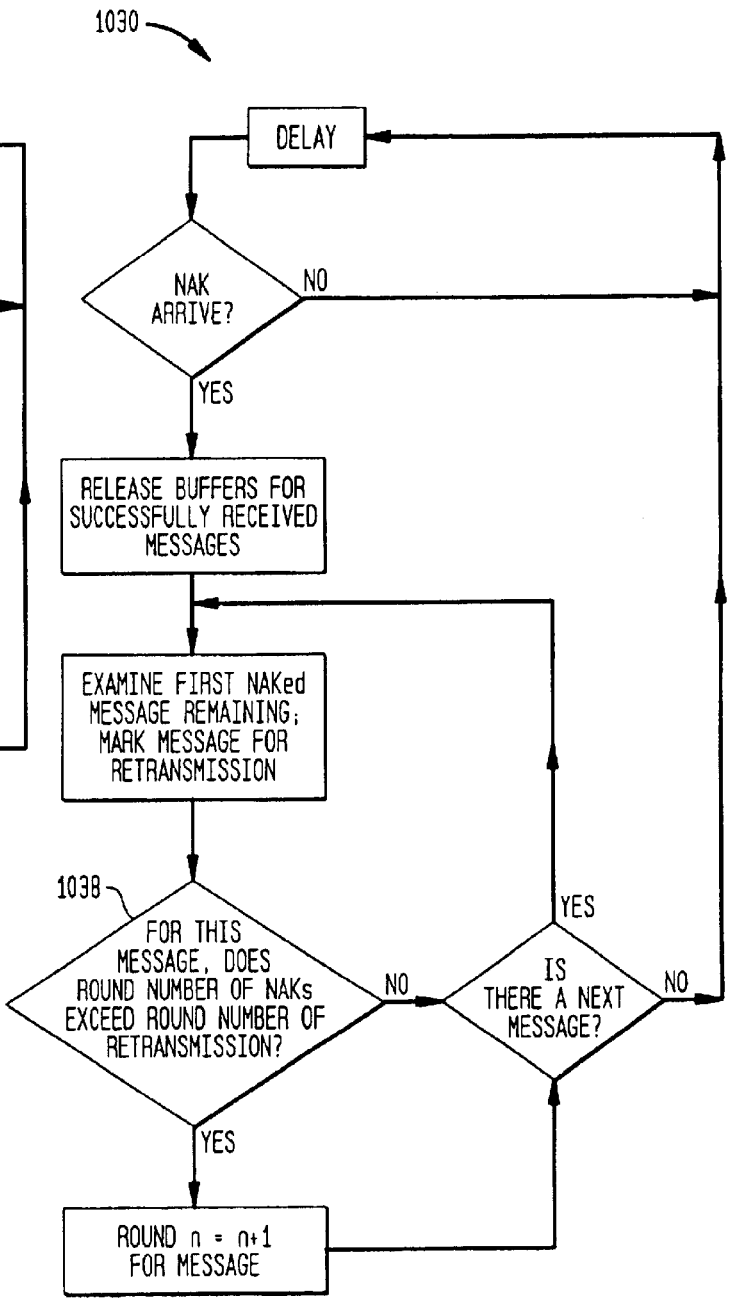

A transmitblock2 subprocess 1010 (in FIG. 10(a)) differs from the transmitblock subprocess 840 (FIG. 8(b)) and an inputmessage2 subprocess 1020 (in FIG. 10(b)) differs from the input message subprocess 850 (in FIG. 8(c)), in that send timers at the sender 12 have been eliminated. A comparison of a NAKreceive 2 subprocess 1030 (in FIG. 10(c)) and the corresponding NAKreceive subprocess 860 (in FIG. 8(d)) shows that the send timers have been replaced in an architecture that inserts a round number, such as the field 150, in a NAK, and that compares that round number to the round number of retransmission (step 1038). The overhead of setting up and retaining timers at the sender 12 for each message is eliminated. Yet, we retain the NAK screening advantages in reduced traffic and improved burst control, leading to better message flow.

The systems and methods of this invention may be realized on a computer network or a computer using communications software. For example, they may be implemented as enhancements to the RLP standard for CDMA (Code-Division Multiple Access). They are, however, not limited to such, and have applications in other protocols.

While the best mode for carrying out the invention has been described in detail, those familiar with the art to which this invention relates will recognize various alternative designs and embodiments for practicing the invention as defined by the following claims.

What is claimed is:

1. A communication method in a wireless network having a sending node and a receiving node, comprising:

transmitting a first message to the receiving node;

receiving a NAK indicating a failure to receive the first message, the NAK including synchronization information for synchronizing the sending node and the receiving node;

screening the NAK to compare receipt of the NAK with respect to a predetermined time period after the first message is transmitted; and suppressing retransmission of the first message if the screening step determines that the sending node received the NAK within the predetermined rime period.

2. The method of claim 1, wherein the predetermined time period is based on an estimate of a round trip transmission between the sending node and the receiving node.

3. The method of claim 1, further comprising retransmitting the first message if the screening step determines that the NAK was received in the receiving step outside of the predetermined time period.

4. The method of claim 3, wherein the retransmitting step comprises retransmitting the first message a plurality of times.

5. The method of claim 4, wherein the NAK includes a count corresponding to the first message, and wherein the number of retransmissions of the first message depends on the count.

6. The method of claim 3, further comprising transmitting a second message different from the first message and a third message different from the first message and the second message along with the retransmission of the first message.

7. The method of claim 1, wherein the NAK includes a count corresponding to the first message, and wherein the screening step is conducted based on the count.

8. The method of claim 7, wherein the count also corresponds to a second message sent by the sending node.

9. The method of claim 1, wherein the suppressing step is also conducted if an estimated rate of incoming data to the sending node exceeds a predetermined data rate threshold.

10. The method of claim 1, further comprising determining an error rate to control message flow between the sending node and the receiving node; wherein the NAK is excluded from the determining step if the suppressing step is conducted.

11. The method of claim 1, wherein the NAK includes an identifier of a second message received by the receiving node, and wherein the method further comprises ignoring the identifier if the suppressing step is conducted.

12. A communication method in a wireless network having a sending node and a receiving node, comprising:

determining whether a first message has been received;

sending a NAK if the first message has not been received, the NAK including synchronization information for synchronizing the sending node and the receiving node, wherein the NAK is screened by the sending node with respect to a predetermined time period after the first message is sent; and checking for a retransmission of the first message, wherein the first message is retransmitted if the sending node receives the NAK sent in the sending step within the predetermined time period.

13. The method of claim 12, wherein the sending step comprises sending a plurality of consecutive NAKs.

14. The method of claim 12, further comprising including a count in the NAK, wherein the count corresponds to the first message.

15. The method of claim 14, wherein the sending step comprises sending a plurality of consecutive NAKs, each of said plurality of consecutive NAKs including the count, and wherein the count is identical for each of said plurality of consecutive NAKs.

16. The method of claim 14, further comprising updating the count when the first message fails to arrive at the receiving node within a selected time window.

17. The method of claim 12, further comprising receiving a plurality of messages, wherein each of said plurality of messages have a sequence number corresponding to an order in which the messages are to be outputted at the receiving node.

18. The method of claim 17, wherein the plurality of messages includes at least a first message and a second message, said first and second messages having respective sequence numbers, and wherein the receiving node does not receive a message with a sequence number intervening between the respective sequence numbers.

* * * * *